United States Patent [19]

Pfaendner et al.

[11] Patent Number: 5,756,596
[45] Date of Patent: May 26, 1998

[54] INCREASING THE MOLECULAR WEIGHT OF POLYAMIDES

[75] Inventors: Rudolf Pfaendner, Rimbach/Odenwald; Heinz Herbst, Lautertal-Reichenbach; Kurt Hoffmann, Lautertal, all of Germany

[73] Assignee: Ciba Specialty Chemicals Corporation, Tarrytown, N.Y.

[21] Appl. No.: 835,245

[22] Filed: Apr. 7, 1997

Related U.S. Application Data

[63] Continuation of Ser. No. 673,669, Jun. 25, 1996, abandoned, which is a continuation of Ser. No. 443,050, May 17, 1995, abandoned, which is a continuation-in-part of Ser. No. 168,742, Dec. 16, 1993, abandoned.

[51] Int. Cl.$^6$ .......................... C08F 283/04; C08G 8/28; C08G 59/68
[52] U.S. Cl. .......................... 525/423; 525/504; 525/508; 525/533; 525/538; 528/89; 528/108
[58] Field of Search ...................... 525/423, 504, 525/508, 533, 538; 528/89, 108

[56] References Cited

U.S. PATENT DOCUMENTS

| | | | |
|---|---|---|---|
| 2,732,367 | 1/1956 | Shokal | 528/108 |
| 3,281,505 | 10/1966 | Spivack | 260/953 |
| 3,310,575 | 3/1967 | Spivack | 524/579 |
| 3,790,648 | 2/1974 | Schmidt et al. | 524/131 |
| 3,824,192 | 7/1974 | DiBattista et al. | 524/131 |
| 3,865,786 | 2/1975 | Mueller et al. | 524/131 |
| 3,901,848 | 8/1975 | DiBattista et al. | 524/131 |
| 3,932,781 | 1/1976 | Fenyes et al. | 524/131 |
| 4,069,200 | 1/1978 | Spivack | 524/131 |
| 4,778,840 | 10/1988 | Linhart et al. | 524/131 |
| 4,845,168 | 7/1989 | Dukes et al. | 525/423 |
| 4,912,175 | 3/1990 | Wheland et al. | 525/420 |
| 5,013,818 | 5/1991 | Takemura et al. | 525/438 |
| 5,116,919 | 5/1992 | Buzinkai et al. | 525/420 |
| 5,142,000 | 8/1992 | Wheland | 525/420 |
| 5,250,619 | 10/1993 | Heinz et al. | 525/425 |

FOREIGN PATENT DOCUMENTS 0353969   2/1990   European Pat. Off. .

OTHER PUBLICATIONS

P. Baierweck et al., "Betriebsmittelkantaminierte Kfz–Teilewiederverwerten"; Kunstoffe 82(1992) pp. 915–920.

*Primary Examiner*—Randy Gulakowski
*Attorney, Agent, or Firm*—Victoria M. Malia

[57] ABSTRACT

An increase in the molecular weight of a polyamide or recycled polyamide, essentially without crosslinking, can be achieved by blending said polyamide with a polyfunctional epoxy resin and a sterically hindered hydroxyphenylalkylphosphonic acid ester or half-ester and heating the blend to above the melting point (or the glass transition temperature) of the polyamide, in the absence of a catalyst of the type used in the polymerization of polyamides.

13 Claims, No Drawings

INCREASING THE MOLECULAR WEIGHT OF POLYAMIDES

This is a continuation of Application Ser. No. 08/673,669 filed Jun. 25, 1996 now abandoned which is a continuation of application Ser. No. 08/443,050 filed May 17, 1995 now abandoned which is a continuation in part of application Ser. No. 08/168,742 filed on Dec. 16, 1993 now abandoned.

The present invention relates to a process for increasing the molecular weight of polyamides and to the polyamides obtainable by said process.

Polyamides are important thermoplastic compounds from the group of the industrial plastics having superior strength, rigidity, hardness and heat distortion. These mechanical and physical properties depend essentially on the molecular weight of the polymer. Reduced molecular weight makes possible only a limited high-quality recycling of used polyamides and production waste, typically generated from fibre production and injection moulding, without carrying out an aftertreatment.

It is generally known to enhance the material properties of used polyamides, i.e. polyamides damaged by heat or hydrolysis, which damage is typically accompanied by a molecular weight reduction. As polycondensates, polyamides are obtained by a postcondensation in the solid state (S. Fakirov, Kunststoffe 74 (1984), 218 and R. E. Gr ützner, A. Koine, Kunststoffe 82 (1992), 284). However, this method is troublesome and is, moreover, highly sensitive to the impurities that may be present in waste material.

It is therefore the object of this invention to provide a process that makes it possible to increase the molecular weight of polyamides in a relatively short time.

Surprisingly, it has been found possible to increase the molecular weight of polyamide substantially by fusing the polyamide and blending it with a mixture of at least one polyfunctional epoxy resin and a sterically hindered hydroxyphenylalkylphosphonic acid ester or half-ester. This molecular weight increase effects an enhancement of the properties of the polyamide, especially that resulting from injection moulding, and of recyclates.

Accordingly, the invention relates to a process for increasing the molecular weight of polyamides, essentially without crosslinking, which comprises heating a polyamide blended with a polyfunctional epoxy resin and a sterically hindered hydroxyphenylalkylphosphonic acid ester or half-ester to above the melting point (or the glass transition temperature) of the polyamide, which process is carried out in the absence of a catalyst of the type used in the polymerization of polyamides.

Polyamides will be understood as meaning aliphatic and aromatic polyamides or copolyamides that are derived from diamines and dicarboxylic acids and/or from aminocarboxylic acids or the corresponding lactams. The suitable monomers contain preferably 6 to 12 carbon atoms. Illustrative examples of suitable polyamides are: PA 6, PA 11, PA 12, PA 66, PA 69, PA 610, PA 612, as well as amorphous polyamides of the Trogamid PA 6-3-T and Grilamid TR 55 types. Polyamides of the indicated kind are commonly known and commercially available.

The invention is of particular importance with respect to the polyamide recyclates recovered from production waste, useful material collections, or the obligatory returnables originating from, inter alia, the automotive industry or the electrical sector. The polyamide recyclates are damaged by heat and/or hydrolysis in a wide variety of ways. These recyclates may basically be the polyamides already mentioned; but they may also be blends of polyamide 6 and polyamide 66, depending on the type of useful material collection. Furthermore, these recyclates may also contain minor amounts of plastics of different structure such as styrene polymers (ABS, ASA) or polyesters, as well as standard impurities such as paint residues, metal traces, fuel residues or also traces of water.

The preferred polyamides in the practice of this invention are PA 6 and PA 66 or mixtures thereof, as well as recyclates based thereon.

Polyfunctional epoxy resins may be of aliphatic, aromatic, cycloaliphatic, araliphatic or heterocyclic structure. They contain epoxy groups as side-groups or these groups form a part of an alicyclic or heterocyclic ring system. The epoxy groups are preferably attached as glycidyl groups through ether or ester linkages to the remainder of the molecule, or they are N-glycidyl derivatives of heterocyclic amines, amides or imides. Epoxy resins of these types are commonly known and commercially available.

The epoxy resins contain at least two radicals of formula I

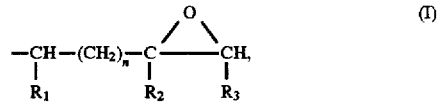

which radicals are attached direct to oxygen, nitrogen or sulfur atoms, wherein $R_1$ and $R_3$ are both hydrogen, $R_2$ is hydrogen or methyl, and n=0, or wherein $R_1$ and $R_3$ together are —$CH_2$—$CH_2$— or —$CH_2$—$CH_2$—$CH_2$—, and $R_2$ is in this case hydrogen and n=0 or 1.

Illustrative examples of epoxy resins are:

I) Polyglycidyl and poly(β-methylglycidyl) esters which are obtainable by reacting a compound containing at least two carboxyl groups in the molecule and epichlorohydrin or glycerol dichlorohydrin or β-methyl epichlorohydrin. The reaction is conveniently carried out in the presence of a base.

Compounds containing at least two carboxyl groups in the molecule may suitably be aliphatic polycarboxylic acids. Exemplary of these polycarboxylic acids are glutaric acid, adipic acid, pimelic acid, suberic acid, azelaic acid, sebacic acid or dimerised or trimerised linoleic acid.

Cycloaliphatische polycarboxylic acids may also be used, for example tetrahydrophthalic acid, 4-methyltetrahydrophthalic acid, hexahydrophthalic acid or 4-methylhexahydrophthalic acid.

Aromatic polycarboxylic acids may also be used, including phthalic acid, isophthalic acid, trimellitic acid or pyromellitic acid.

Carboxyl-terminated adducts can also be used, for example of trimellitic acid and polyols, typically glycerol or 2,2-bis(4-hydroxycyclohexyl)propane.

II) Polyglycidyl or poly(P-methylglycidyl) ethers which are obtainable by reacting a compound containing at least two free alcoholic hydroxyl groups and/or phenolic hydroxyl groups in the molecule with a suitably substituted epichlorohydrin, under alkaline conditions or in the presence of an acid catalyst and subsequent treatment with an alkali.

Ethers of this type are typically derived from acyclic alcohols such as ethylene glycol, diethylene glycol and higher poly(oxyethylene) glycols, 1,2-propanediol, or poly (oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, bis-(trimethylol)propane, pentaerythritol, sorbitol, as well as from polyepichlorohydrins.

They may also be derived from alcohols such as 1,3- or 1,4-dihydroxycyclohexane, bis(4-hydroxycyclohexyl)

methane, 2,2-bis(4-hydroxycyclohexyl)propane or 1,1-bis (hydroxymethyl)cyclohex-3-ene, or they contain aromatic nuclei, such as N,N-bis(2-hydroxyethyl)aniline or p,p'-bis (2-hydroxyethylamino)diphenylmethane.

The epoxy resins may also be derived from mononuclear phenols such as resorcinol or hydroquinone, or they are based on polynuclear phenols such as bis(4-hydroxyphenyl) methane, 2,2-bis(4-hydroxyphenyl)propane (bisphenol A), 2,2-bis(3,5-dibromo-4-hydroxyphenyl)propane, 4,4'-dihydroxydiphenylsulfone, 4,4'-dihydroxybiphenyl, 2,2'-dihydroxybiphenyl, a mixture of bis(hydroxyphenyl) methanes (bisphenol F) or 9,9-bis(4-hydroxyphenyl) fluorene, or condensates of phenols with formaldehyde which are obtained under acid conditions, for example phenol novolaks.

III) Poly(N-glycidyl) compounds are obtainable, for example, by dehydrochlorination of the reaction products of epichlorohydrin with amines which contain at least two amino hydrogen atoms. These amines are typically aniline, toluidine, n-butylamine, bis(4-aminophenyl)methane, m-xylylenediamine or bis(4-methylaminophenyl)methane, or also N,N,O-triglycidyl-m-aminophenol or N,N,O-triglycidyl-p-aminophenol.

The poly(N-glycidyl) compounds, however, also include N,N'-diglycidyl derivatives of cycloalkylene ureas such as ethyleneurea or 1,3-popyleneurea and N,N'-diglycidyl derivatives of hydantoins, such as 5,5-dimethylhydantoin.

IV) Poly(S-glycidyl) compounds are typically bis-S-glycidyl derivatives which are derived from dithiols such as 1,2-ethanedithiol or bis(4-mercaptomethylphenyl) ether.

V) Exemplary of epoxy resins containing a radical of formula I, wherein $R_1$ and $R_3$ together are —CH$_2$—CH$_2$— and n is 0, are bis(2,3-epoxycyclopentyl) ether, 2,3-epoxycyclopentylglycidyl ether or 1,2-bis(2,3-epoxycyclopentyloxy) ethane. An epoxy resin containing a radical of formula I, wherein $R_1$ and $R_3$ together are —CH$_2$—CH$_2$— and n is 1, is typically 3,4-epoxy-6-methylcyclohexyl-3',4'-epoxy-6'-methylcyclohexanecarboxylate.

It is preferred to use epoxy resins containing two functional groups. In principle, however, it is also possible to use epoxy resins containing three or more functional groups. But in this case comparatively low concentrations of additive are used so as to avoid crosslinking of the polyamide.

Diglycidyl compounds of aromatic structure are mainly used.

It is also preferred to use aromatic epoxy resins having 2, 3 or 4 glycidyl groups.

It is also possible in some cases to use a mixture of epoxy resins of different structure.

Particularly preferred polyfunctional epoxy resins are diglycidyl ethers of bisphenols, such as 2,2-bis(4-hydroxyphenyl)propane (bisphenol A) or bis(4-hydroxyphenyl)methane, or mixtures of bis(ortho-/para-hydroxyphenyl)methane (bisphenol F), 4,4'-dihydroxybiphenyl or 9,9-bis(4-hydroxyphenyl)fluorene.

Solid epoxy resins of the diglycidyl ether of bisphenol A type are very particularly preferred, e.g.: Araldite® GT 6071, GT 7071, GT 7072, GT 6097 and GT 6099.

Sterically hindered hydroxyphenylalkylphosphonic acid esters and half-esters are disclosed, inter alia, in U.S. Pat. No. 4,778,840, and may be, illustrated by the following formula:

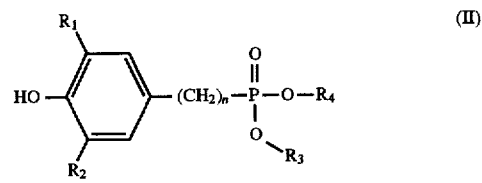

wherein $R_1$ is isopropyl, tert-butyl, cyclohexyl or cyclohexyl which substituted by 1 to 3 $C_1$–$C_4$alkyl groups;

$R_2$ is H, $C_1$–$C_4$alkyl, cyclohexyl or cyclohexyl which substituted by 1 to 3 $C_1$–$C_4$alkyl groups;

$R_3$ is $C_1$–$C_{20}$alkyl or substituted or unsubstituted phenyl or naphthyl;

$R_4$ is H, $M^{2+}/2$, $C_1$–$C_{20}$alkyl or substituted or unsubstituted phenyl or naphthyl; $M^{2+}/2$ is a divalent metal cation per two phenol molecules, and n is 1 to 6.

Substituents defined as alkyl containing up to 20 carbon atoms may suitably be methyl, ethyl, propyl, butyl, pentyl, hexyl, octyl, decyl, dodecyl, tetradecyl, hexadecyl and octadecyl as well as corresponding branched isomers. $C_2$–$C_4$Alkyl and $C_{18}$alkyl are preferred.

Suitable substituents of the phenyl or naphthyl radicals are typically $C_1$–$C_4$alkyl groups.

Suitable divalent metal cations are Zn, Ba, Ca and Mg. Ca is particularly preferred.

Preferred compounds of formula (II) are those that contain at least one tert-butyl group as $R_1$ or $R_2$. Compounds in which $R_1$ and $R_2$ are tert-butyl are very particularly preferred.

Preferably n is 1 or 2 and, most preferably, 1.

Particularly preferred sterically hindered hydroxyphenylalkylphosphonic acid esters and half-esters are

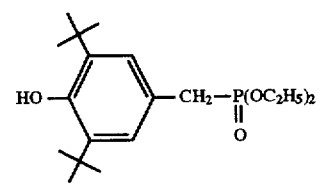

and

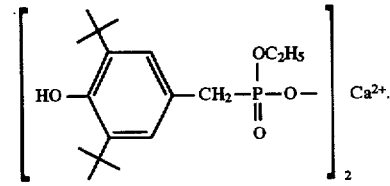

The process can be carried out in any heatable apparatus fitted with a stirrer. The process may, however, also be carried out in a kneader, typically a Brabender mixing chamber or in an extruder. It is immaterial whether the process is carried out under an inert gas atmosphere ($N_2$) or in the presence of atmospheric oxygen.

The polyamide material to be heated and the mixture of epoxy resin and phenol are usually charged to the apparatus at the start of heating; but a subsequent addition of the epoxy resin/phenol mixture to the polyamide is also possible. Heating to above the melting point or glass transition temperature is normally carried out with stirring until the epoxy resin/phenol mixture is homogenised. The temperature depends on the polyamide used. In the case of crystalline polyamides, it is preferred to carry out the process in the range from the melting point to about 50° C. above the respective melting point. In the case of amorphous polyamides, it is preferred to carry out the process in the range from about 50° to 150° C. above the respective glass transition temperature.

The epoxy resin and the phenol can be added, independently of each other, as powder, liquid, granulate or in compacted form or also in some cases on a substrate such as silica gel, or together with a polymer powder or wax, e.g. a polyethylene wax.

It is preferred to add, per 100 parts of polyamide, from 0.1 part to 10 parts of an epoxy resin and 0.01 part to 5 parts of a sterically hindered hydroxyphenylalkylphosphonic acid ester or half-ester. It is particularly preferred to add to 100 parts of polyamide from 0.2 part to 2.5 parts of an epoxy resin and 0.05 to 1 part of a sterically hindered hydroxyphenylalkylphosphonic acid ester or half-ester. The amount of epoxy resin and sterically hindered hydroxyphenylalkylphosphonic acid ester or half-ester will depend on the initial molecular weight of the polymer and on the desired final molecular weight. Thus, when using a severely damaged polyamide, i.e. one having a low moecular weight, it is preferred to use epoxy resin and phenol in the upper weight region. But if only a low increase in molecular weight is desired, then it is preferred to use epoxy resin and phenol in low concentration. In addition, the functionality of the epoxy resin and the end group content will be taken into account, i.e. an epoxy resin of low molecular weight will generally be used in a lower concentration than one of high molecular weight.

In addition to the mixture of a polyfunctional epoxy resin and a sterically hindered hydroxyphenylalkylphosphonic acid ester or half-ester, it it also possible to add different modifiers, preferably stabilisers, to the polyamide. Those skilled in the art will be familiar with these stabilisers, which will be chosen in accordance with the specific requirement made of the final product. It is preferred to add light stabilisers or also antioxidants (Gächter/Müller "Kunststoffadditive", Hanser Verlag).

Particularly suitable stabilisers include:

a) Antioxidants such as the esters of β-(3,5-di-tert-butyl-4-hydroxyphenyl) propionic acid and β-(5-tert-butyl-4-hydroxy-3-methylphenyl)-propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl)isocyanurate, N,N'-bis(hydroxyethyl) oxamide, as well as the amides of these acids, e.g. N,N'-bis-(3,5-di-tert-butyl-4-hydroxyphenylpropionyl) hexamethylenediamine, N,N'-bis(3,5-di-tert-butyl-4-hydroxyphenylpropionyl)trimethylenediamine and N,N'-bis (3,5-di-tert-butyl-4-hydroxyphenylpropionyl)hydrazine.

Preferred antioxidants are those of the Irganox 1098 and Irganox 245 type, preferably in conjunction with aromatic phosphites or phosphonites. Illustrative examples of such phosphites or phosphonites are triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, distearyl pentaerythritol diphosphite, bis(2,4-di-tert-butylphenyl) pentaerythritol diphosphite, tristearyl sorbitol triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5]undecane, 3,9-tris(2,4,6-tris-tert-butylphenoxy)-2,4,8,10-tetraoxa-3,9-diphosphaspiro[5.5] undecane and 2,2'-ethylidene-bis(4,6-di-tert-butylphenyl) fluorophosphite. Irgafos 168 is particularly preferred.

b) Light stabilisers such as 1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis [4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$-]$_2$, where R=3'-tert-butyl-4'-hydroxy-5'-2H-benzotriazol-2-ylphenyl.

2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

3. Esters of substituted and unsubstituted benzoic acids, as for example 4-tertbutyl-phenyl salicylate, phenyl salicylate, octylphenyl salicylate, dibenzoyl resorcinol, bis(4-tert-butyl-benzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

6. Sterically hindered amines, for example bis(2,2,6,6-tetramethyl-piperidyl)sebacate, bis-(2,2,6,6-tetramethyl-piperidyl)succinate, bis(1,2,2,6,6-pentamethylpiperidyl) sebacate, bis-(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dion, bis(1-octyloxy-2,2,6,6-tetramethylpiperidyl)sebacate, bis(1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione.

7. Oxamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethoxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl] -4,6-bis(2,4-dimethyl)-1,3,5-triazine.

Preferred light stabilisers are those of classes 1, 6 and 7, including light stabilisers of the Chimassorb 944, Chimassorb 119, Tinuvin 234, Tinuvin 312 or Tinuvin 770 type.

If necessary, the polyamides can be blended with standard modifiers such as fillers and reinforcing agents, preferably glass fibres, lubricants, flame retardants and antistatic agents.

If the polyamide is a recyclate, it can also be blended with new material or together with new material, conveniently in a co-extrusion process.

The invention further relates to the use of a mixture comprising a polyfunctional epoxy resin and a sterically hindered hydroxyphenylalkylphosphonic acid ester or half-ester, which mixture does not contain a catalyst of the type used in the polymerization of polyamides, for increasing the molecular weight of polyamide, essentially without crosslinking, and to the polyamide, which is essentially non-crosslinked, containing said components. The preferred utilities and preferred polyamides are the same as those referred to in connection with the process.

The invention also relates to mixtures comprising a polyamide, which is essentially non-crosslinked, a polyfunctional epoxy resin and a sterically hindered hydroxyphenylalkylphosphonic acid ester or half-ester, which mixture does not contain a catalyst of the type used in the polymerization of polyamides. The preferences in connection with said mixtures are the same as those referred to in connection with the process.

The invention is illustrated by the following non-limitative Examples in which and in the remainder of the description, unless otherwise stated, parts and percentages are by weight.

The following compounds are used:

1) Polyamide 66 (predamaged): Ultramid® A3K (BASF AG) is artificially damaged by storing the granulate for 168 h at 95° C. in water.

2) Polyamide 66: Ultramid® A3K (BASF AG).

3) Polyamide 6: Durethan® B 30 S (Bayer AG).

4) Polyamide 6 coated production waste.

The polyamides are predried in a vacuum drying oven at c. 100° C.

The sterically hindered phenols are:

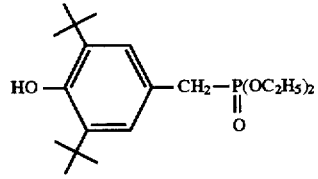

Irganox ® 1222 and

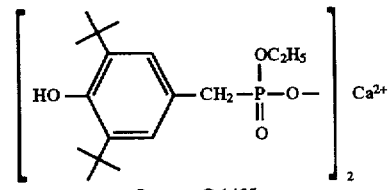

Irganox ® 1425

The epoxy resins are:

Epoxy resin Araldite® GT 6071 (diglycidyl ether of bisphenol A resin having an epoxy value of 2.15–2.22 eq/kg and a softening range of 70°–75° C.).

Epoxy resin Araldite® GT 6099 (diglycidyl ether of bisphenol A resin having an epoxy value of 0.34–042 eq/kg and a softening range of 143°–158° C.).

Epoxy resin BSG® (diglycidyl ether of bisphenol S (diglycidyl ether of 4,4'-dihydoxydiphenylsulfone)

Epoxy resin Araldite® GY 281 (diglycidyl ether of bisphenol F)

Epoxy resin BBG® (diglycidyl ether of 4,4'-dihydroxybiphenyl)

Epoxy resin BFG® (diglycidyl ether of 9,9-bis(4-hydroxyphenyl)fluorene)

EXAMPLES 1–11

In a glass tube with stirrer, the respective polyamide granular formulation and the components are heated under a stream of nitrogen in an oil bath heated to 280° C. After 10 minutes the polymer blend is sufficiently fused to be stirrable. The blend is stirred for 20 minutes and then removed from the glass tube. The viscosity number according to DIN 53 727 is determined by dissolving 0.25 g of the predried granular formulation in 50 ml of 96% sulfuric acid and measuring at 25° C. Alternatively, the reduced viscosity is determined by measuring it in a solution of 0.25 g of the polymer in 100 g of o-dichlorobenzene/phenol (1:1) at 30° C.

TABLE 1

Increase in the molecular weight of polyamide 66 (predamaged)

| Example | Parts per 100 parts of PA 6.6 hindered phenol | | Parts per 100 parts of PA 6.6 epoxy resin | | red. visc. in o-di-chloro-benzene/ phenol (dl/g) | Viscosity number in 96% H$_2$SO$_4$ [ml/g] |
|---|---|---|---|---|---|---|
| 1 | — | Comparison Example | — | | 1.60 | 168 |
| 2 | 0.5 | Irganox 1425 | 0.5 | GT 6071 | n.d. | 178 |
| 3 | 1 | Irganox 1425 | 1 | GT 6071 | n.d. | 197 |
| 4 | 1 | Irganox 1425 | 2 | GT 6071 | 1.96 | n.d. |
| 5 | 2 | Irganox 1425 | 1 | GT 6071 | n.d. | 192 |
| 6 | 1 | Irganox 1222 | 1 | GT 6071 | n.d. | 196 |

TABLE 2

Increase in the molecular weight of polyamide 66

| Example | Parts per 100 parts of PA 6.6 hindered phenol | | Parts per 100 parts of PA 6.6 epoxy resin | | red. visc. (dl/g) | Viscosity number [ml/g] |
|---|---|---|---|---|---|---|
| 7 | — | Comparison Example | — | | 1.80 | 181 |
| 8 | 0.5 | Irganox 1425 | 0.5 | GT 6071 | n.d. | 229 |
| 9 | 1 | Irganox 1425 | 1 | GT 6071 | 2.60 | n.d. |
| 10 | 1 | Irganox 1222 | 1 | GT 6071 | n.d. | 255 |
| 11 | 1 | Irganox 1425 | 1 | GT 6099 | n.d. | 232 | n.d. = not determined

Tables 1 and 2 show a marked increase in the reduced viscosity, which is indicative of an increase in the molecular weight.

EXAMPLES 12–23

Durethan® B30 S) is kneaded for 30 minutes under nitrogen and at a temperature of 232° C. in a Brabender Plasticorder with mixing chamber 50, and the torque is determined as a function of the time. Afterwards the reduced viscosity and the melt flow index are measured. The values obtained are reported in Table 3.

TABLE 3

Increase in the molecular weight of polyamide 6

| | Parts per 100 parts of PA 6 hindered phenol | | Parts per 100 parts of PA 6 epoxy resin | | Torque (N · m) after min | | MVI 225/2.16 | viscosity number |
|---|---|---|---|---|---|---|---|---|
| | | | | | 10 | 30 | g/10 min | ml/g |
| Ex. 12 | Comparison Ex. | | — | — | 3.7 | 4.0 | 23.7 | 129 |
| 13 | 1 | Irganox 1425 | 1 | GT 6071 | 6.6 | 9.4 | 6.0 | 137 |
| 14 | 0.5 | Irganox 1425 | 1 | GT 6071 | 6.9 | 9.5 | 7.0 | 145 |
| 15 | 0.25 | Irganox 1425 | 1 | GT 6071 | 7.0 | 9.3 | 7.7 | 143 |
| 16 | 0.25 | Irganox 1425 | 2 | GT 6071 | 12.8 | 13.6 | 4.2 | 138 |
| 17 | 1 | Irganox 1222 | 1 | GT 6071 | 7.6 | 13.5 | 5.3 | 150 |
| 18 | 0.25 Irganox 1425 0.25 Irganox 1222 | | 1 | GT 6071 | 7.1 | 11.0 | 5.4 | 152 |
| 19 | 0.5 | Irganox 1425 | 1 | BSG | 16.9 | 25.1 | 1.6 | 181 |

The increase in torque and the reduced viscosity as well as the decrease in the melt flow index indicate a marked increase in the molecular weight of the samples treated by the process of this invention.

TABLE 4

Increase in the molecular weight of polyamide 6

| Example | Parts per 100 parts of PA 6 hindered phenol | | Parts per 100 parts of PA 6 epoxy resin | | Torque (N · m) after min | | MVI 225/2.16 | viscosity number |
|---|---|---|---|---|---|---|---|---|
| | | | | | 10 | 30 | g/10 min | ml/g |
| 20 | 1 | Irganox 1425 | 1 | BFG | 10.6 | 13.9 | n.d. | 156 |
| 21 | 1 | Irganox 1425 | 1 | BBG | 17.8 | 20.0 | n.d. | 185 |
| 22 | 1 | Irganox 1425 | 1 | GY 281 | 18.9 | 20.5 | n.d. | 192 |
| 23 | 1 | Irganox 1222 | 1 | GY 281 | 22.0 | 20.4 | n.d. | 188 |

EXAMPLES 24–26

Durethan B 30 S and the indicated components are processed at 240° C. and 50 rpm on a Haake Rheocord 90 twin-screw extruder. The values reported in Table 5 are determined.

TABLE 5

| | Increase in molecular weight of polyamide 6 | | |
|---|---|---|---|
| Example | Parts per 100 parts of PA 6 hindered phenol | Parts for 100 parts of PA 6 epoxy resin | viscosity number ml/g |
| 24 | none | (Comparison Example) | 131 |
| 25 | 0.25 | 1  GT 6071 | 134 |
| 26 | 0.25 | 1  GT 6071 | 135 |

EXAMPLES 27–28

Polyamide 66 Ultramid A3K and the indicated components are processed at 280° C. and 100 rpm on a Werner and Pfleiderer ZSK 25 twin-screw extruder. The values reported in Table 6 are determined.

TABLE 6

| | Increase in molecular weight of polyamide 66 | | | |
|---|---|---|---|---|
| Example | Parts per 100 parts of PA 6 hindered phenol | Parts per 100 parts of PA 6 epoxy resin | red. viscosity (dl/g) | MVI 275/2.16 [g/10 min] |
| 27 | none | (Comparison Example) | 1.40 | 80 |
| 28 | 0.1  Irganox 1425 | 2  GT 6071 | 1.60 | 21 |

EXAMPLES 29–36

Polyamide 6 Durethan B 30 S and the indicated components are processed at 240° C. and 100 rpm on a Werner and Pfleiderer ZSK 25 twin-screw extruder. The values reported in Table 7 are determined.

TABLE 7

| | Increase in molecular weight of polyamide 6 | | | |
|---|---|---|---|---|
| Example | Parts per 100 parts PA 6 hindered phenol | Parts per 100 parts PA 6 epoxy resin | MVI 225/2.16 g/10 min | red. viscosity (dl/g) |
| 29 | none | (Comparison Example) | 15.0 | 1.32 |
| 30 | 0.25  Irganox 1425 | 0.25  GT 6071 | 13.8 | 1.40 |
| 31 | 0.25  Irganox 1425 | 0.50  GT 6071 | 12.0 | 1.44 |
| 32 | 0.50  Irganox 1425 | 0.50  GT 6071 | 10.6 | 1.48 |
| 33 | 1.00  Irganox 1425 | 1.00  GT 6071 | 11.0 | 1.56 |
| 34 | 0.05  Irganox 1425 | 2.00  GT 6071 | 6.1 | n.d. |
| 35 | 0.10  Irganox 1425 | 2.00  GT 6071 | 3.5 | 1.64 |
| 36 | 0.25  Irganox 1425 | 2.00  GT 6071 | 4.8 | 1.64 |

EXAMPLES 37–40

Polyamide 6 (waste generated from the production of coated wheel shields, c. 25 % glass fibre filling) is kneaded under nitrogen at 228° C. in a Brabender Plasticorder with mixing chamber W 50. The following values are determined:

TABLE 8

| | Increase in molecular weight of polyamide 6 (production waste) | | | | | |
|---|---|---|---|---|---|---|
| | Parts per 100 parts PA 6 | Parts per 100 parts PA 6 | Torque (N · m) after min | | | red. viscosity |
| Example | hindered phenol | epoxy resin | 10 | 20 | 30 | [dl/g] |
| 37 | none | — (Comparison Example) | 7.9 | 7.3 | 6.6 | 1.00 |
| 38 | 1  Irganox 1425 | 1  GY 281 | 30.8 | 26.9 | 23.6 | 1.56 |
| 39 | 1  Irganox 1425 | 1  GT 6071 | 17.0 | 18.0 | 16.7 | 1.28 |
| 40 | 1  Irganox 1425 | 1  GT 6071 | 19.4 | 18.2 | 15.9 | 1.28 |

EXAMPLES 41 AND 42

Polyamide 6 (waste generated from the production of coated wheel shields, c. 25 % glass fibre filling) and the indicated components are processed at 240° C. and 100 rpm on a Werner and Pfleiderer ZSK 25 twin-screw extruder. The values reported in Table 9 are determined:

TABLE 9

| | Increase in molecular weight of polyamide (production waste) | | | |
|---|---|---|---|---|
| Example | Parts per 100 parts of PA 6 hindered phenol | Parts per 100 parts of PA 6 epoxy resin | MVI 225/2.16 g/10 min | red. viscosity (dl/g) |
| 41 | none | (Comparison example) | 7.9 | 1.08 |
| 42 | 0.25  Irganox 1425 | 0.25  GT 6071 | 1.5 | 1.36 |

What is claimed is:

1. A process for increasing the molecular weight of polyamides, essentially without crosslinking, wherein the increase in molecular weight is indicated by a decrease in melt volume rate of at least about 8% as measured according to ISO 1133, the process comprising:

(A) feeding to a melt processing apparatus a composition which comprises
  i. a polyamide,
  ii. 0.1 to 10 weight percent, per 100 weight percent of the polyamide, of a polyfunctional epoxy resin; and
  iii. 0.01 to 5 weight percent, per 100 weight percent of the polyamide; of a sterically hindered hydroxyphenylalkylphosphonic acid ester or half-ester of formula II

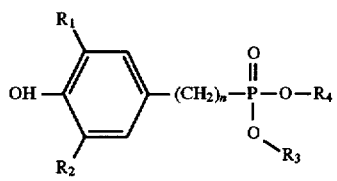

(II)

wherein

R$_1$ is isopropyl, tert-butyl, cyclohexyl or cyclohexyl which is substituted by 1 to 3 C$_1$–C$_4$ alkyl groups;

R$_2$ is H, C$_1$–C$_4$ alkyl, cylcohexyl or cyclohexyl which is substituted by 1 to 3 C$_1$–C$_4$ alkyl groups;

R$_3$ is C$_1$–C$_{20}$ alkyl or a C1–C4 alkyl substituted or unsubstituted phenyl or naphthyl;

R$_4$ is H, M$^{2+}$/2, C$_1$–C$_{20}$ alkyl or C1–C4 substituted or unsubstituted phenyl or naphthyl;

M$^{2+}$/2 is a divalent metal cation per two phenol molecules, and n is 1 to 6; and (B) mixing by extruding the composition of (A) in the melt processing apparatus at temperatures above the melting point (or glass transition temperature) of the polyamide;

wherein said process is carried out in the absence of a catalyst of the type used in the polymerization of polyamides.

2. A process according to claim 1, which comprises using a polyamide recyclate recovered, inter alia, from production waste, useful material collections or obligatory returnables.

3. A process according to claim 1, wherein the polyfunctional epoxy resin is an aromatic epoxy resin containing 2, 3 or 4 glycidyl groups.

4. A process according to claim 1, wherein the polyfunctional epoxy resin is a diglycidyl ether of a bisphenol.

5. A process according to claim 4, wherein the bisphenol is selected from the group consisting of 2,2-bis(4-hydroxyphenyl)propane (bisphenol A) or bis(4-hydroxyphenyl)methane, or mixtures of bis(ortho-/para-hydroxyphenyl)methane (bisphenol F), 4,4'-dihydroxybiphenyl and 9,9-bis(4-hydroxyphenyl)fluorene.

6. A process according to claim 1, wherein the sterically hindered hydroxyphenylalkylphosphonic acid ester or half-ester is a compound of formula:

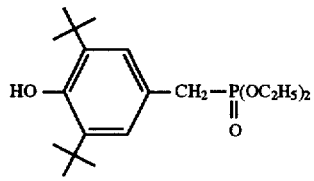

or

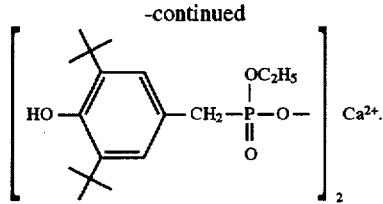

7. A process according to claim 1 wherein from 0.2 to 2.5 parts of a polyfunctional epoxy resin and 0.05 to 1 part of a sterically hindered hydroxyphenylalkylphosphonic acid ester or half-ester are used per 100 parts of polyamide.

8. A process according to claim 1, wherein the polyamide is polyamide 6, polyamide 66 or a mixture thereof.

9. A process according to claim 1 wherein the polyamide is a polyamide recyclate or a thermally and/or hydrolytically damaged polyamide.

10. A polyamide of increased molecular weight prepared by the process of claim 1.

11. A polyamide recyclate of increased molecular weight prepared by the process of claim 1.

12. A composition which comprises
   i. a polyamide,
   ii. 0.1 to 10 weight percent, per 100 weight percent of the polyamide, of a polyfunctional epoxy resin; and
   iii. 0.01 to 5 weight percent, per 100 weight percent of the polyamide; of a sterically hindered hydroxyphenylalkylphosphonic acid ester or half-ester of formula II

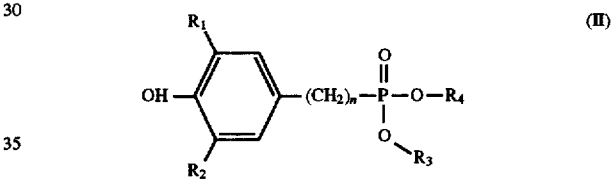

(II)

wherein

R$_1$ is isopropyl, tert-butyl, cyclohexyl or cyclohexyl which is substituted by 1 to 3 C$_1$–C$_4$ alkyl groups;

R$_2$ is H, C$_1$–C$_4$ alkyl, cylcohexyl or cyclohexyl which is substituted by 1 to 3 C$_1$–C$_4$ alkyl groups;

R$_3$ is C$_1$–C$_{20}$ alkyl or a C1–C4 alkyl substituted or unsubstituted phenyl or naphthyl;

R$_4$ is H, M$^{2+}$/2, C$_1$–C$_{20}$ alkyl or a C1–C4 alkyl substituted or unsubstituted phenyl or naphthyl:

M$^{2+}$/2 is a divalent metal cation per two phenol molecules, and n is 1 to 6;

wherein said composition is essentially non-crosslinked and does not contain a catalyst of the type used in the polymerization of polyamides.

13. A composition according to claim 12 wherein the polyamide is a polyamide recyclate or a thermally and/or hydrolytically damaged polyamide.

* * * * *